US010001153B1

(12) United States Patent
Fan

(10) Patent No.: US 10,001,153 B1
(45) Date of Patent: Jun. 19, 2018

(54) HOLDING BRACKET WITH FOUR CLAW UNITS

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 0 days. days.

(21) Appl. No.: 15/684,616

(22) Filed: Aug. 23, 2017

(51) Int. Cl.
*A47G 1/10* (2006.01)
*F16B 2/12* (2006.01)
*F16M 13/02* (2006.01)
*H04B 1/3877* (2015.01)

(52) U.S. Cl.
CPC .............. *F16B 2/12* (2013.01); *F16M 13/02* (2013.01); *H04B 1/3877* (2013.01)

(58) Field of Classification Search
USPC .......................................... 248/316.4, 346.07
See application file for complete search history.

(56) References Cited

U.S. PATENT DOCUMENTS

| | | | | |
|---|---|---|---|---|
| 2,164,299 A * | 6/1939 | Mandell | .................... | A47G 1/08 122/1 R |
| 7,537,190 B2 * | 5/2009 | Fan | ......................... | B60R 11/02 248/309.1 |
| 7,967,269 B2 * | 6/2011 | Liu | ........................ | G03B 21/58 248/176.3 |
| 8,638,557 B2 * | 1/2014 | Tsai | ..................... | F16M 11/041 248/919 |
| 8,833,716 B2 * | 9/2014 | Funk | ...................... | F16M 13/02 248/309.1 |
| 9,004,434 B2 * | 4/2015 | Kang | ...................... | H04M 1/04 248/229.12 |
| 9,161,466 B2 * | 10/2015 | Huang | ................... | H05K 5/0204 |
| 9,749,002 B1 * | 8/2017 | Fan | ....................... | H04B 1/3888 |
| 9,797,543 B2 * | 10/2017 | Lin | ....................... | F16M 11/041 |
| 2006/0278788 A1 * | 12/2006 | Fan | ......................... | B60R 11/02 248/309.1 |
| 2012/0312936 A1 * | 12/2012 | Huang | ................. | F16M 11/041 248/122.1 |
| 2013/0270850 A1 * | 10/2013 | Fan | ........................... | A45F 5/00 294/137 |
| 2014/0263931 A1 * | 9/2014 | Chen | .................... | F16M 11/041 248/576 |

* cited by examiner

Primary Examiner — Monica E Millner
(74) Attorney, Agent, or Firm — Rabin & Berdo, P.C.

(57) ABSTRACT

A holding bracket includes a main body having several guiding rails crossing one another at their centers, where a gearwheel is disposed rotatably; four claw units in the main body, each having a toothed section meshed with the gearwheel and a sliding section contacting a respective guiding rail and a holding section and a portion of the sliding exposed from the main body such that rotation of the gearwheel results in simultaneous movement of the claw units relative to the main body. A biasing unit is confined in the main body and associates with one claw unit. A one-way brake unit disposed in the main body is movable linearly and contacts the sliding section of one claw unit such that when the brake unit is under an unreleased condition, the four claw units are movable only in a single direction toward the gearwheel or the center of the main body.

9 Claims, 8 Drawing Sheets

HOLDING BRACKET WITH FOUR CLAW UNITS

BACKGROUND OF THE INVENTION

1. Field of the Invention

The present invention relates generally to a holding bracket, and more particularly a holding bracket having four claw units for stably and firmly holding four corner of a smart phone once placed thereon.

2. The Prior Arts

Due to advance of electronic technology, a smart phone becomes an indispensable gadget for every body, since the smart phone provides variety of functions such that some people use the smart phone even when they are riding bicycles or driving the vehicles. Hence, a variety of hand-free holding brackets are available in the market for holding the smart phones during the riding and/or driving operation. However, since the hand-free holding device may frequently wobble and/or incline due to vibration of the riding speed of the driving vehicle, which in turn, impedes the gripping force of the hand-free holding brackets. Presently, in most hand-free holding brackets, left and right gripping claws are used while in other holding brackets, triple gripping claws are used for holding the smart phone, but it is noted that these methods fail to provide firm and stable gripping force relative to the smart phone, such that the smart phone sometimes falls off the hand-free holding bracket.

SUMMARY OF THE INVENTION

A primary objective of the present invention is to provide a holding bracket having four claw units with specific structures, which, under a released condition, can move swiftly outward for releasing a smart phone therefrom. When it is desired to hold a smart phone thereon, manipulating any one of the claw units result in simultaneous movement of all the claw units toward a center of the bracket, thereby gripping the smart phone securely and firmly therein so as to facilitate the user.

In order to achieve the objective mentioned above, a holding bracket of the present invention includes: a main body defining an interior space provided with a plurality of guiding rails crossing one another at their centers, where a gearwheel is disposed rotatably; four claw units, each having a toothed section, a sliding section and a holding section, wherein the holding section and a portion of the sliding section are exposed to an exterior of the main body while the toothed section and the other portion of the sliding section are confined within the interior space of the main body such that the toothed sections are meshed with different parts of the gearwheel and the sliding sections are in contact with the guiding rails so that rotation of the gearwheel results in simultaneous movement of the four claw units respect to the main body; a biasing unit disposed in the main body for biasing the four claw units, thereby exposing the holding sections of the claw units to the exterior of the main body; and a one-way braking unit disposed movably within a braking frame, which is confined within the main body such that the one-way braking unit contacts with and is associated with one of the claw units such that when the one-way braking unit is under an unreleased condition, the four claw units are only movable in a single direction toward the gearwheel.

Preferably, the main body is constituted by a front body and a rear body coupled to the front body for defining the interior space therebetween, wherein the plurality of guiding rails are formed in the rear body in an X configuration.

Preferably, the guiding rails include four guiding rails divided in two sets, which are disposed at different elevations. The four claw units are divided in two sets, wherein each of the toothed sections has a width smaller than the sliding section of a respective one of the claw units such that the toothed sections of one set of the claw units are meshed with the gearwheel at the same elevation and extend in parallel manner relative to each other while the toothed sections of another set of the claw units are meshed with the gearwheel and extend in parallel manner relative to each other at the same elevation below the preceding set.

In one embodiment, the rear body is further formed with four position limiting stems respectively extending the four guiding rails. The sliding section of each of the claw units is formed with an elongated slide slot permitting extension of a respective one of the position limiting stems, thereby preventing untimely disengagement of the claw units from the main body.

Preferably, the rear body further defines a spring-receiving chamber for accommodating the biasing unit therein such that the biasing unit has one end biasing a wall confining the chamber and the other end biasing one of the claw units, thereby exposing the holding sections of the claw units to an exterior of the main body.

In one embodiment of the present invention, the one-way braking unit includes a brake disposed movable linearly within the braking frame and having a row of inclined teeth, a brake spring disposed in the braking frame for biasing the brake, and a release button having an insert block formed with an inclined face. The brake defines a block-reception space for receiving the insert block therein and has a first inclined face in sliding contact with the inclined face of the release button. The sliding section of each of the claw units has a unidirectional rack meshed with the inclined teeth of the brake when no external force is applied thereon such that pressing of the release button results in linear movement of the brake, which in turn, causes disengagement between the inclined teeth of the brake relative to the unidirectional rack of a respective one of the claw units.

Preferably, the release button is exposed at least partially from the rear body so as to facilitate manipulation by a user.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
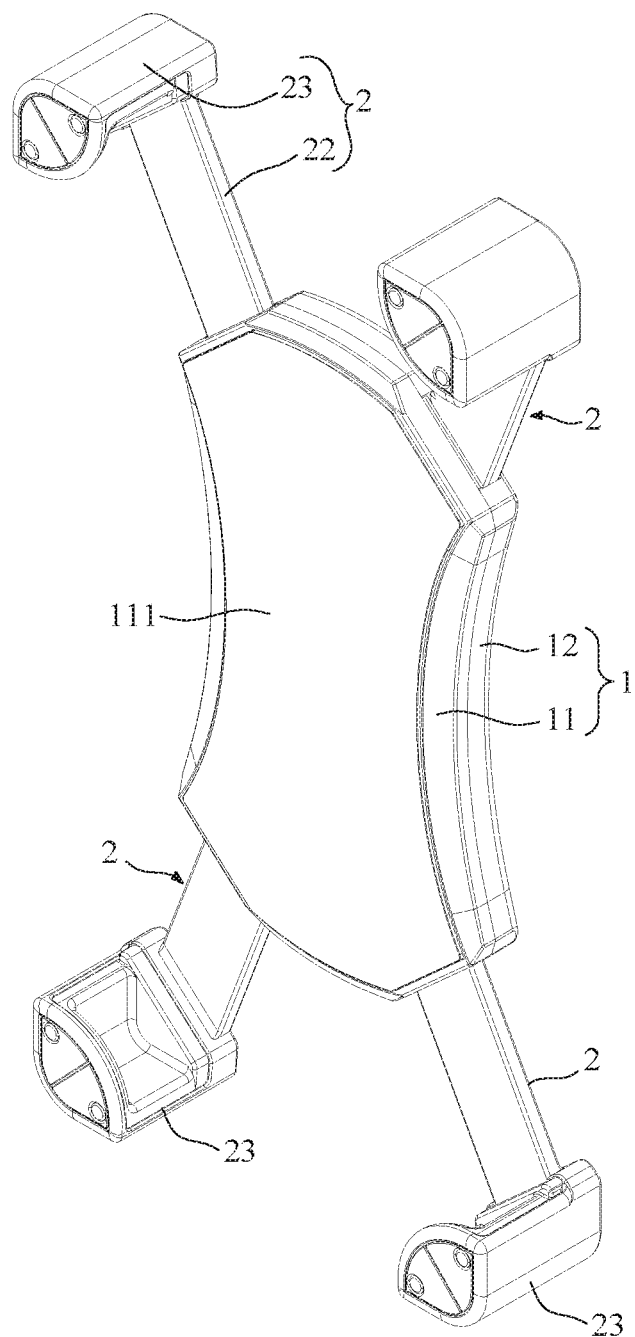
FIG. 1 is a perspective front view of a holding bracket with four claw units of the present invention.
Figure 2:
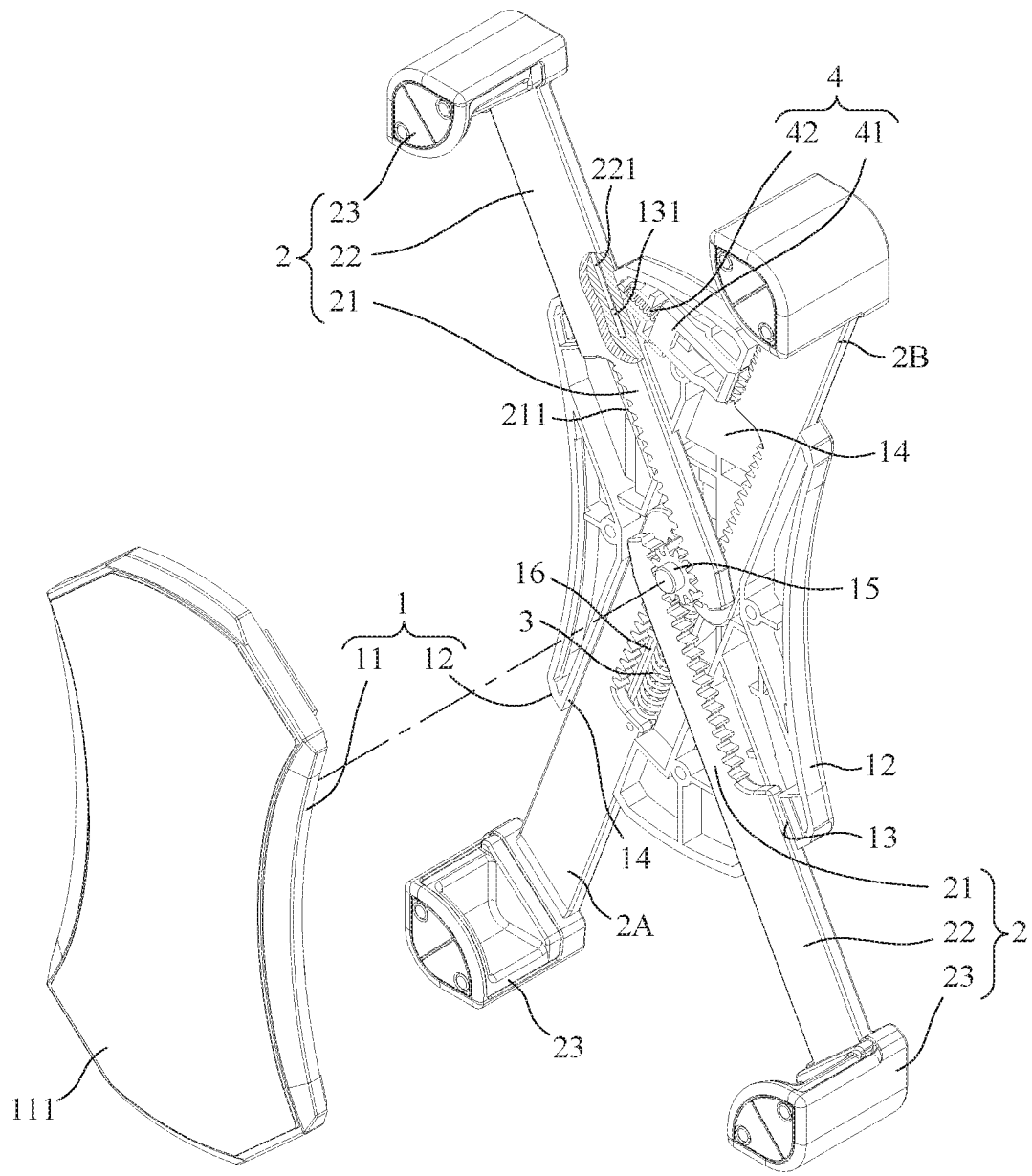
FIG. 2 is an exploded view of the holding bracket with four claw units of the present invention.
Figure 8:
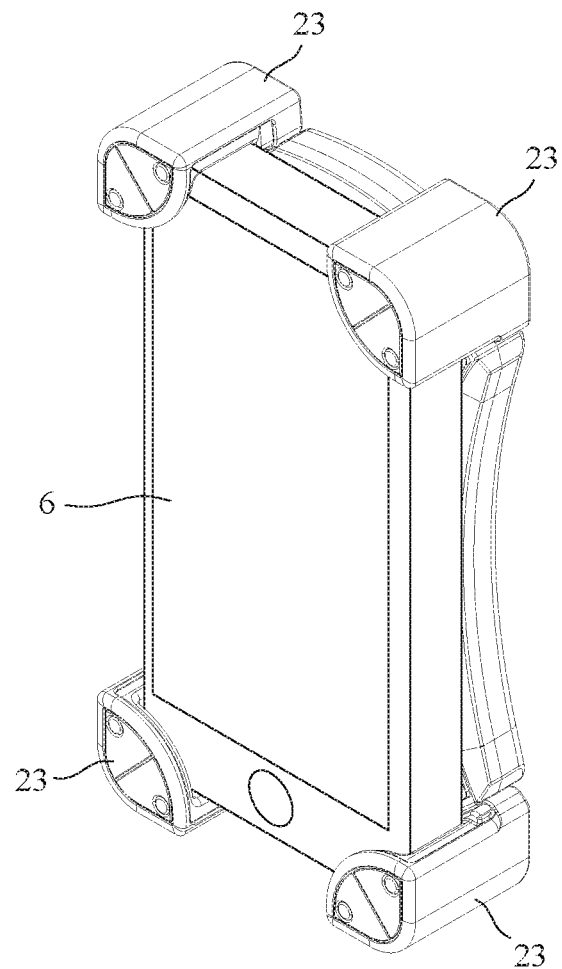
FIG. 8 is a perspective front view of the holding bracket of the present invention, illustrating a state how the claw units gripping a smart phone thereamong.

Referring to FIGS. 1 and 2, wherein FIG. 1 is a perspective front view of a holding bracket with four claw units of the present invention; and FIG. 2 is an exploded view of the holding bracket with four claw units of the present invention. As shown, a holding bracket of the present invention includes: a main body 1, four claw units 2, a biasing unit 3 and a one-way braking unit 4. One feature of the present invention resides in that when the one-way braking unit 4 is under an unreleased condition, the four claw units 2 are only movable swiftly in a single direction toward a center of the main body 1 so as to securely and firmly grip a smart phone placed on the main body 1, as best shown in FIG. 8, In the same manner, when the one-way braking unit 4 is under a released condition, the claw units 2 are movable outwardly from the main body 1 by virtue of biasing action of the biasing unit 3 so as to release the smart phone from being gripped by the claw units 2.

The main body 1 is constituted by a front body 11 and a rear body 12 coupled to the front body 11 for defining an interior space between the front and rear bodies 11, 12, wherein the front body 11 defines a receiving surface 111 for receiving a smart phone 6 thereon (see FIG. 8) while a plurality of guiding rails 13, 14 are formed in the rear body 12 in an X configuration. To be more specific, the guiding rails 13, 14 cross one another at their centers, where a gearwheel 15 is disposed rotatably. Preferably, the guiding rails 13, 14 include four guiding rails divided in two sets, disposed at different elevations. As illustrated in FIG. 2, the guiding rails 13 are located at a higher elevation than the guiding rails 14 which a located at a lower elevation when compared with the former set.

The four claw units 2 are divided in two sets. Each claw unit 2 has a toothed section 21, a sliding section 22 and a holding section 23, wherein the holding sections 23 are exposed to an exterior of the main body 1 while the toothed and sliding sections 21, 22 are confined within the interior space of the main body 1 such that the toothed sections 21 are meshed with the gearwheel 15 at different parts and the sliding sections 22 are in contact with the guiding rails 13, 14 so that rotation of the gearwheel 15 results in simultaneous movement of the four claw units 2 respect to the main body 1.

Note that each of the toothed sections 21 has a width smaller than the sliding section 22 of a respective one of the claw units 2 such that the toothed sections 21 of one set of the claw units 2 are meshed with the gearwheel 15 at the same elevation and extend in parallel manner relative to each other while the toothed sections 21 of another set of the claw units 2 are meshed with the gearwheel 15 and extend in parallel manner relative to each other at the same elevation below the preceding set. To be more specific, due to different elevation, simultaneous movement of two sets of the claw units 2 does not interfere relative to each other.

The biasing unit 3 is disposed in the main body 1 for biasing the four claw units 2, thereby exposing the holding sections 23 of the claw units 2 to the exterior of the main body 1.

The one-way braking unit 4 is disposed movably within a braking frame 17 (see FIG. 4), which is formed integrally within the main body 1 such that the one-way braking unit 4 contacts and is associated with one of the claw units 2 such that when the one-way braking unit 4 is under an unreleased condition, the four claw units 2 are only movable in a single direction toward the gearwheel 15. In other words, the claw units 2 are movable only towards a center of the receiving surface 111 of the main body 1, thereby securely and firmly gripping four corner of a smart phone 6 placed thereon. To be more specific, when the one-way braking unit 4 is under a released condition, the holding sections 23 and portions of the sliding sections 22 of the four claw units 2 are exposed to the exterior of the main body 1 by virtue of biasing action of the biasing unit 3. Preferably, the braking frame 17 is integrally formed with the rear body 12.

Figure 3:
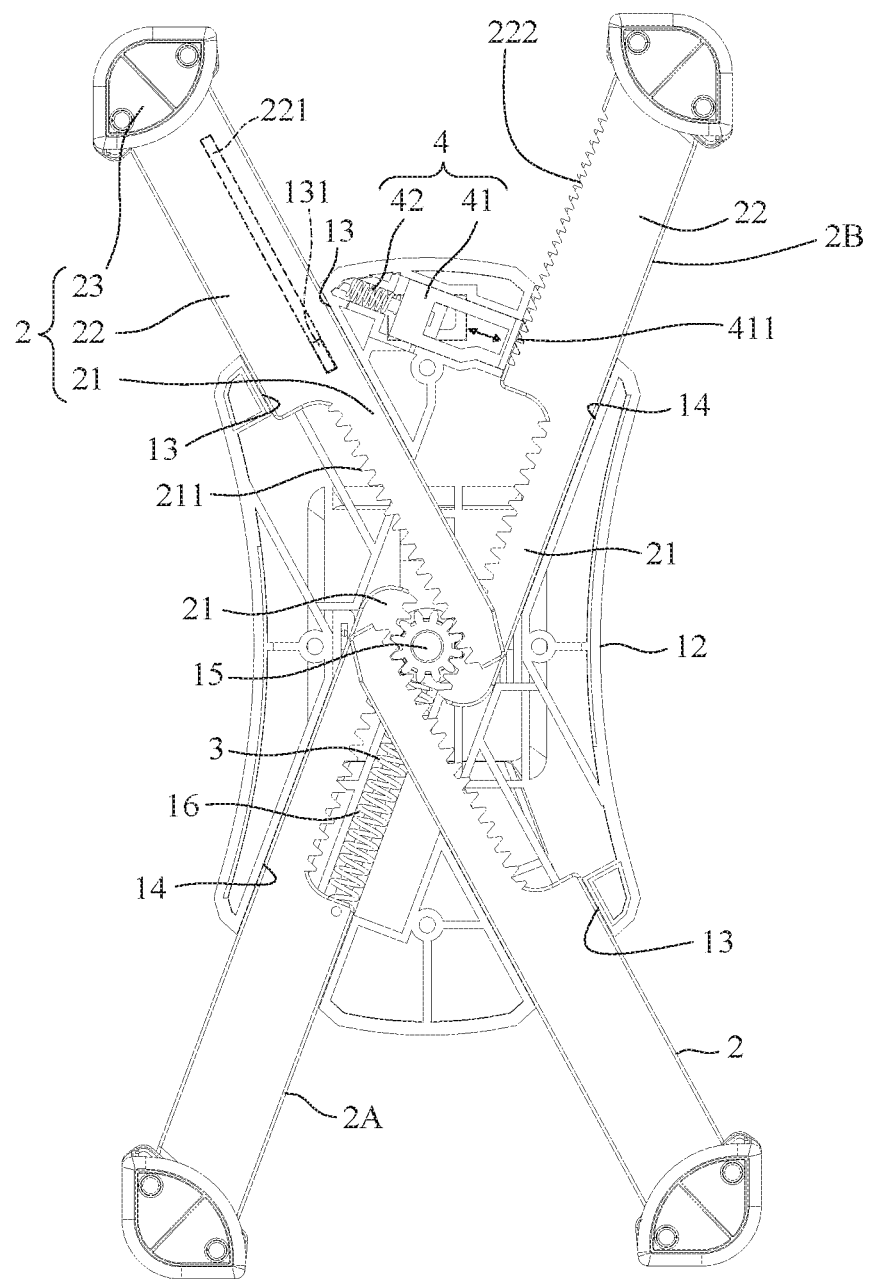
FIG. 3 shows a planar view of the holding bracket with four claw units of the present invention, illustrating the holding bracket in a released condition.
Figure 4:
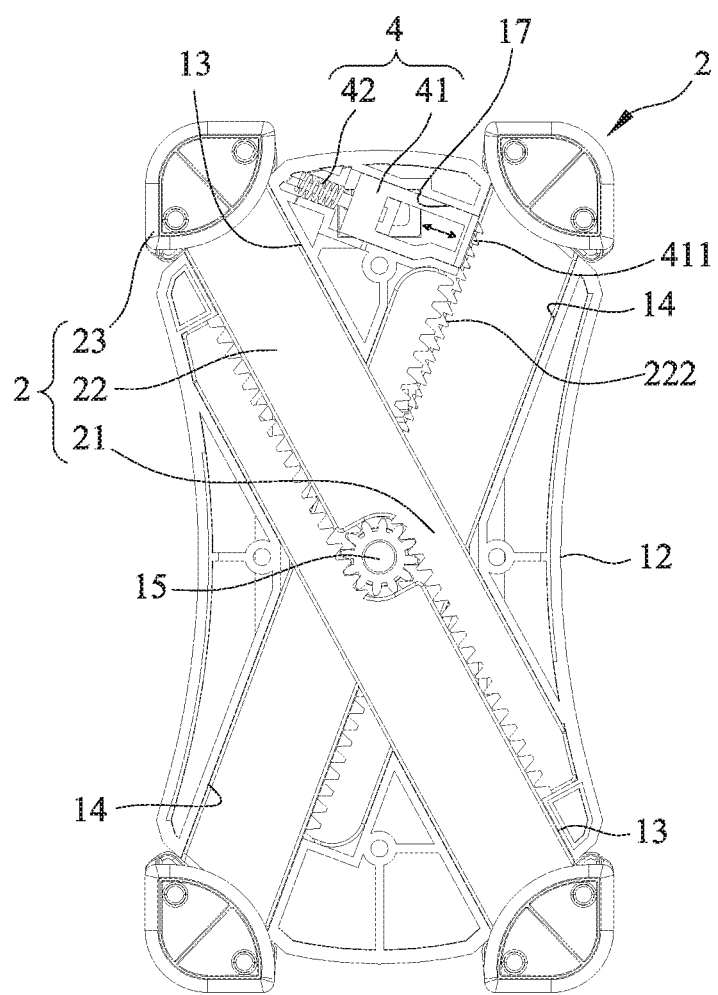
FIG. 4 shows a planar view of the holding bracket with four claw units of the present invention, illustrating the holding bracket in an unreleased condition.

Referring again to FIG. 3, the rear body 12 is preferably further formed with four position limiting stems 131 respectively extending the four guiding rails 13, 14 (see FIG. 4). The sliding section 22 of each of the claw units 2 is formed with an elongated slide slot 221 permitting extension of a respective one of the position limiting stems 131, thereby preventing untimely disengagement of the claw units 2 from the main body 1.

Figure 7:
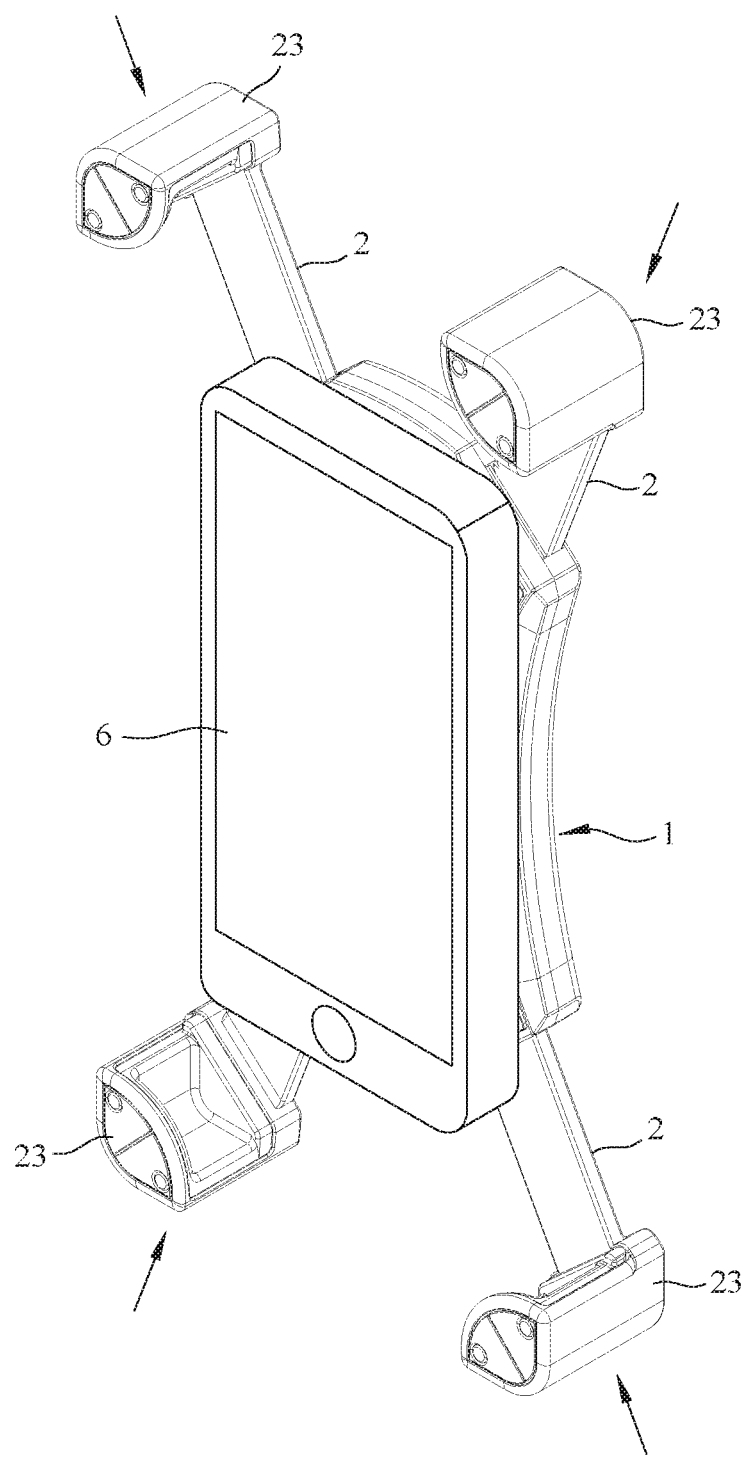
FIG. 7 is a perspective front view of the holding bracket of the present invention, illustrating a state prior to the claw units gripping a smart phone thereamong.

In this embodiment, the holding section 23 extends perpendicularly from the sliding section 22 of the claw unit 2 and further has a triangular cross-section to compliment with four corners of a mobile phone 6 once the mobile phone 6 is placed on the receiving surface 111 of the main body 1 (see FIG. 7).

The rear body 12 further defines a spring-receiving chamber 16 for accommodating the biasing unit 3 (see FIG. 3) therein such that the biasing unit 3, in fact is a compression spring, has one end biasing a wall confining the chamber 16 and the other end biasing one of the claw units 2, thereby exposing the holding sections 23 and portions of the sliding sections 22 of the claw units 2 to an exterior of the main body 1.

In this embodiment, the compression spring 3 and the one-way braking unit 4 are connected to the same claw unit 2 but at different positions. It is to note that the configuration of the compression spring 3 can be designed in accordance with the moving direction of the claw units 2.

Figure 5:
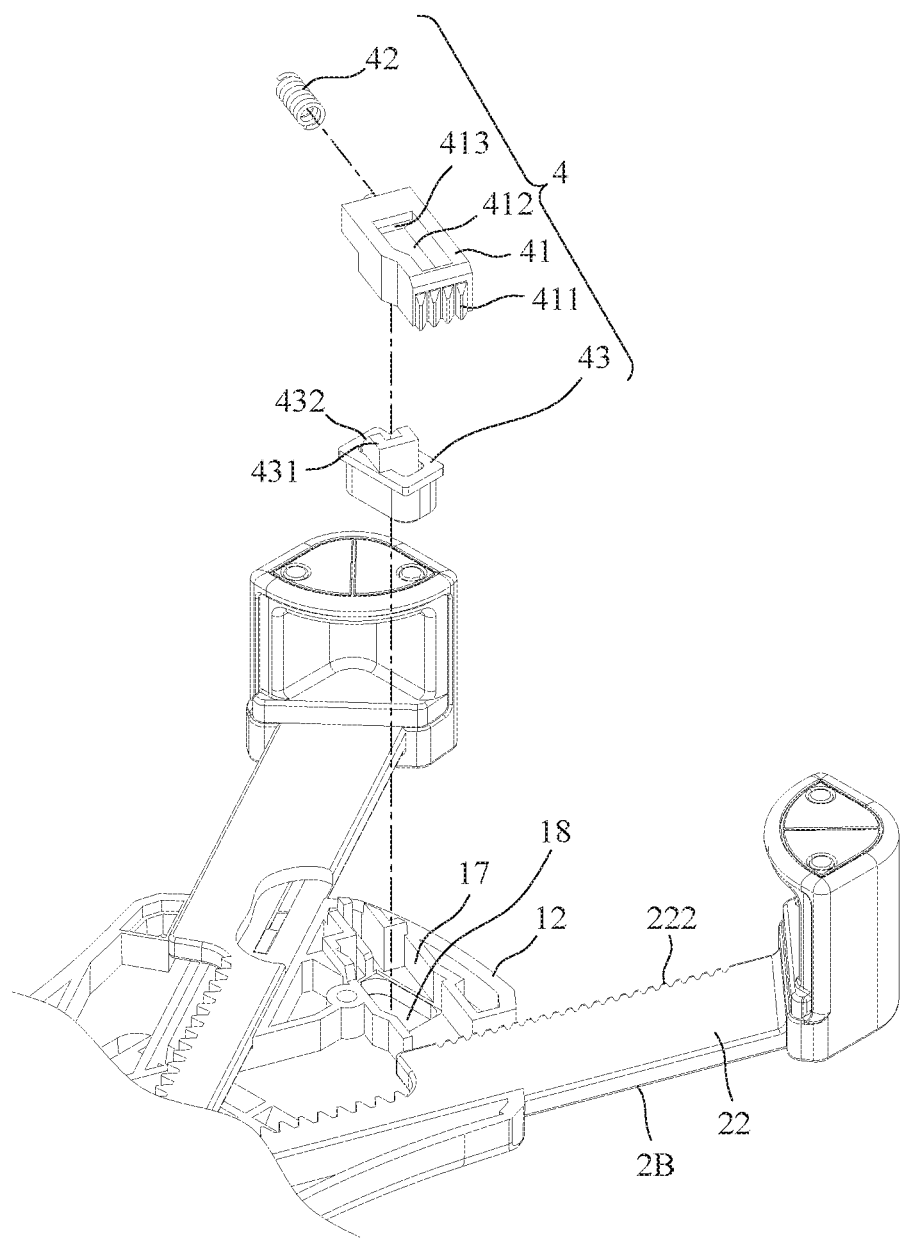
FIG. 5 is a fragmentary view of the holding bracket of the present invention, illustrating a one-way braking unit employed therein.

Referring to FIG. 5, the one-way braking unit 4 includes a brake 41 disposed movable linearly within the braking frame 17 and having a row of inclined teeth 411 at one end thereof, a brake spring 42 disposed in the braking frame 17 for biasing the brake 41, and a release button 43 having an insert block 431 formed with an inclined face 432. The brake 41 preferably defines a block-reception space 412 for receiving the insert block 431 therein and has a first inclined face 413 in sliding contact with the inclined face 432 of the release button 43. The sliding section 22 of one of the claw units 2B has a unidirectional rack 222 meshed with the inclined teeth 411 of the brake 41 when no external force is applied thereon such that pressing of the release button 43 results in linear movement of the brake 41 within the braking frame 17, causes disengagement between the inclined teeth 411 of the brake 41 relative to the unidirectional rack 222 of a respective one of the claw units 2.

Figure 6:
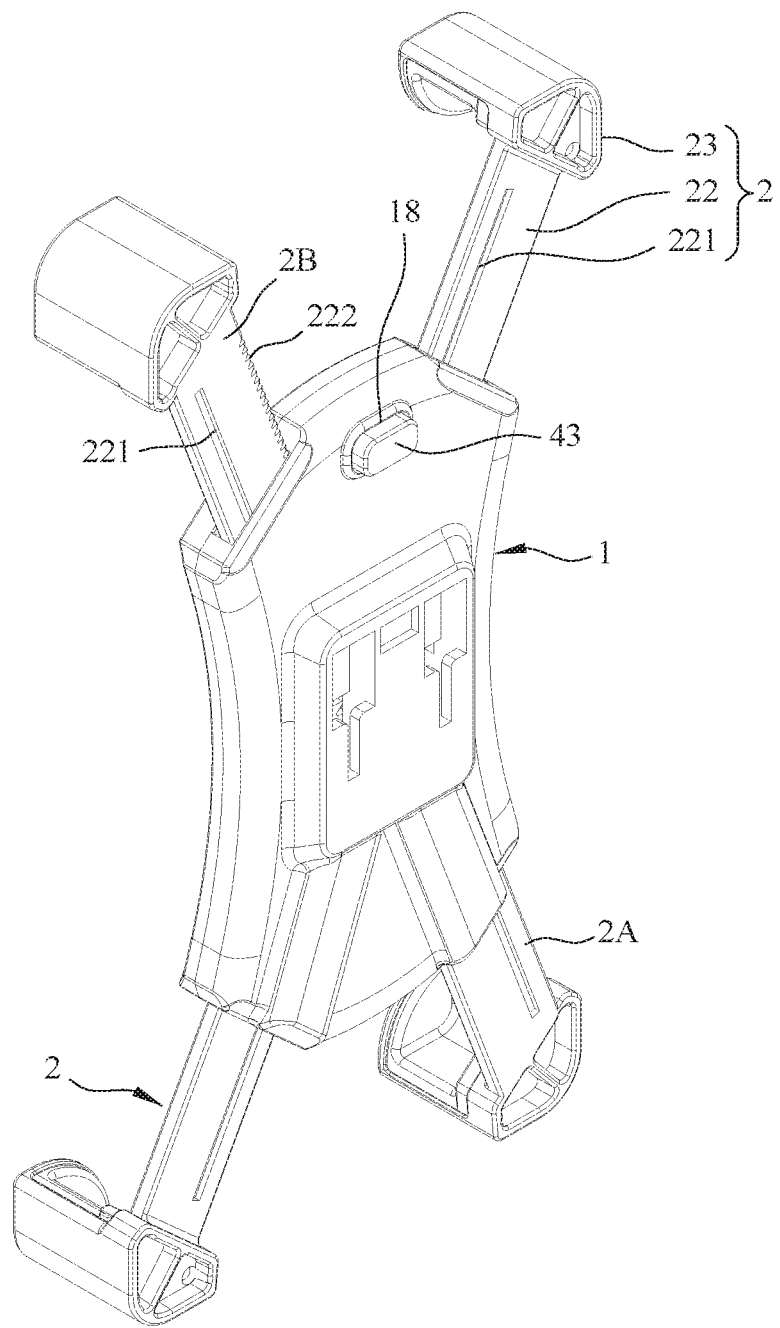
FIG. 6 is a perspective rear view of the holding bracket with four claw units of the present invention.

Referring to FIG. 6, the rear body 12 is further formed with an exposure hole 18 exposing the release button 43 at least partially from the rear body 12 of the main body 1 so as to facilitate manipulation by a user.

Referring to FIG. 7, when it is desired to hold a smart phone by the holding bracket of the present invention, the smart phone 6 is placed first of all on the receiving surface 111 of the front body 11. Then the user can manipulate one of the claw units 2 in the arrow direction, where four claw units 2 simultaneously move toward the center of the receiving space 111 by virtue of the braking unit 4 being disposed at the unreleased condition, thereby gripping four corners of the smart phone 6 firmly and securely among the holding sections 23 of the claw units 2, as best shown in FIG. 8.

In the similar manner, when it is desired to removed the smart phone 6 from the main body 1, the user only needs to press the release button 43, thereby causing the release button 43 to retract into the main body 1, which action, compress the biasing spring 42 so as to release the biasing action against one of the claw units 2B, thereby releasing the braking unit 4 from being disposed at the unreleased condition. In other words, the one-way braking unit 4 at this disposed at the released condition so that the user can remove the smart phone 6 from the main body 1. Note the smart phone 6 has GPS function so as to guide the user to a desired destination in case of driving.

Although the present invention has been described with reference to the preferred embodiments thereof, it is apparent to those skilled in the art that a variety of modifications and changes may be made without departing from the scope of the present invention, which is intended to be defined by the appended claims.

What is claimed is:

1. A holding bracket, comprising:
   a main body defining an interior space provided with a plurality of guiding rails crossing one another at their centers, where a gearwheel is rotatably disposed;
   four claw units, each having a toothed section, a sliding section and a holding section, wherein said holding section and a portion of said sliding section are exposed to an exterior of said main body while said toothed section and another portion of said sliding section are confined within said interior space of said main body in such a manner that said toothed sections are meshed with said gearwheel at different parts and said sliding sections contact said plurality of guiding rails so that rotation of said gearwheel results in simultaneous movement of said four claw units with respect to said main body;
   a biasing unit disposed in said main body for biasing said four claw units, thereby exposing said portion of said sliding section and said holding section of respective ones of said four claw units to said exterior of said main body; and
   a one-way braking unit disposed movably within a braking frame, which is formed within said main body such that said one-way braking unit contacts with and is associated with one claw unit of said four claw units such that when said one-way braking unit is under an unreleased condition, said four claw units are only movable in a single direction toward said gearwheel.

2. The holding bracket according to claim 1, wherein said main body is constituted by a front body and a rear body coupled to said front body for defining said interior space therebetween, wherein said plurality of guiding rails are formed in said rear body in an X configuration.

3. The holding bracket according to claim 1, wherein said plurality of guiding rails include four guiding rails divided in two sets, disposed at different elevations, and said four claw units are divided in two sets, wherein each of said toothed sections has a width smaller than said sliding section of a respective one of said four claw units such that said toothed sections of one set of said four claw units are meshed with said gearwheel at the same elevation and extend in a parallel manner relative to each other while said toothed sections of another set of said four claw units are meshed with said gearwheel and extend in a parallel manner relative to each other at the same elevation below one another.

4. The holding bracket according to claim 1, wherein said main body is constituted by a front body and a rear body coupled to said front body for defining said interior space therebetween, wherein said plurality of guiding rails include four guiding rails divided in two sets, disposed at different elevations, and wherein said rear body is further formed with four position limiting stems respectively extending from said four guiding rails, said sliding section of each of said four claw units is formed with an elongated slide slot permitting extension of a respective one of said four position limiting stems, thereby preventing untimely disengagement of said four claw units from said main body.

5. The holding bracket according to claim 1, wherein said holding section extends perpendicularly from said sliding section of each respective claw unit of said four claw units and further has a triangular cross-section to compliment four corners of a mobile phone once said mobile phone is placed on said main body.

6. The holding bracket according to claim 2, wherein said rear body further defines a spring-receiving chamber for accommodating said biasing unit therein such that said biasing unit has one end biasing a wall confining said spring-receiving chamber and the other end biasing one claw unit of said four claw units.

7. The holding bracket according to claim 1, wherein said biasing unit and said one-way braking unit are connected to said four claw units but at different positions.

8. The holding bracket according to claim 1, wherein said one-way braking unit includes a brake disposed movable linearly within said braking frame and having a row of inclined teeth, a brake spring disposed in said braking frame for biasing said brake, and a release button having an insert block formed with an inclined face, said brake defining a block-reception space for receiving said insert block therein and having a first inclined face in sliding contact with said inclined face of said release button, said sliding section of each claw unit of said four claw units has a unidirectional rack meshed with said inclined teeth of said brake when no external force is applied thereon such that pressing of said release button results in linear movement of said brake, which in turn, causes disengagement between said inclined teeth of said brake relative to said unidirectional rack of a respective one of said four claw units.

9. The holding bracket according to claim 8, wherein said main body is constituted by a front body and a rear body coupled to said front body for defining said interior space therebetween, and wherein said release button is exposed at least partially from said rear body so as to facilitate manipulation by a user.

* * * * *